(12) United States Patent
Uyeno et al.

(10) Patent No.: US 11,333,557 B2
(45) Date of Patent: May 17, 2022

(54) OPTICALLY POWERED CRYOGENIC FOCAL PLANE ARRAY (FPA) WITH AN OPTICAL DATA LINK

(71) Applicant: Raytheon Company, Waltham, MA (US)

(72) Inventors: Gerald P. Uyeno, Tucson, AZ (US); Sean D. Keller, Tucson, AZ (US); Benn Gleason, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 175 days.

(21) Appl. No.: 16/856,680

(22) Filed: Apr. 23, 2020

(65) Prior Publication Data
US 2021/0333154 A1     Oct. 28, 2021

(51) Int. Cl.
| G01J 5/06 | (2022.01) |
| G02B 13/14 | (2006.01) |
| H04B 10/80 | (2013.01) |
| H04B 10/516 | (2013.01) |
| G02B 27/10 | (2006.01) |

(Continued)

(52) U.S. Cl.
CPC ............... *G01J 5/061* (2013.01); *F25B 9/14* (2013.01); *G01J 5/0806* (2013.01); *G02B 13/14* (2013.01); *G02B 27/1006* (2013.01); *H04B 10/516* (2013.01); *H04B 10/807* (2013.01); *F25D 19/00* (2013.01)

(58) Field of Classification Search
CPC ........... G01J 5/061; G01J 5/0806; F25B 9/14; H04B 10/807; H04B 10/516; G02B 27/1006
See application file for complete search history.

(56) References Cited

U.S. PATENT DOCUMENTS

| 4,810,978 A * | 3/1989 | Sato | G01J 5/28 |
| | | | 250/332 |
| 5,119,679 A * | 6/1992 | Frisch | G01D 5/26 |
| | | | 250/227.21 |

(Continued)

FOREIGN PATENT DOCUMENTS

JP     6019508 B1 * 11/2016  ............. G01J 5/061

OTHER PUBLICATIONS

Martinez—US Statutory Invention Registration 1354H—Optical Data Transducer, Sep. 6, 1994 (Year: 1994).*

(Continued)

*Primary Examiner* — David P Porta
*Assistant Examiner* — Jeremy S Valentiner
(74) *Attorney, Agent, or Firm* — Schwegman Lundberg & Woessner, P.A.

(57) ABSTRACT

An optically powered cryogenic FPA with an optical data link eliminates electrical penetrations of the cryogenic chamber for power delivery thereby reducing heat leaks into the cold volume by copper wires and EMI. An optical splitter receives and separates an optical input signal into an optical carrier signal, an optical Data IN signal and an optical power signal. An optical-to-electrical (O/E) converter converts the optical power signal into an electrical power signal, which is converted into a plurality of DC voltage signals to supply power within the chamber. An optical data link modulates the optical carrier signal with electrical signals from the ROIC to form and output an optical Data OUT signal.

21 Claims, 10 Drawing Sheets

(51) Int. Cl.
   *F25D 19/00*    (2006.01)
   *G01J 5/061*    (2022.01)
   *F25B 9/14*     (2006.01)
   *G01J 5/0806*   (2022.01)

(56) References Cited

U.S. PATENT DOCUMENTS

| | | | |
|---|---|---|---|
| 5,146,303 A | | 9/1992 | Kornrumpf et al. |
| H1354 H | * | 9/1994 | Martinez ................... G01J 1/00 250/352 |
| 5,491,334 A | * | 2/1996 | Gartenberg ............ G01J 5/061 250/227.21 |
| 7,587,896 B2 | | 9/2009 | Bin-Nun et al. |
| 2020/0085036 A1 | * | 3/2020 | Creasey ................ F25D 19/006 |
| 2020/0409438 A1 | * | 12/2020 | Tuttle ................... H04B 10/807 |

OTHER PUBLICATIONS

AIM Photonics, AIM Photonics Government Directed Project Call Development of a Prototype FPA Cryogenic Integrated Photonic Datalink, Proposed Research Program, Jan. 2017, pp. 1-11.

* cited by examiner (PRIOR ART)
FIG.1

OPTICALLY POWERED CRYOGENIC FOCAL PLANE ARRAY (FPA) WITH AN OPTICAL DATA LINK

BACKGROUND OF THE INVENTION

Field of the Invention

This invention relates to cryogenic focal plane arrays (FPAs), and more particularly to an optically powered cryogenic focal plane array (FPA) with an optical data link.

Description of the Related Art

Many optical systems employ focal plane arrays (FPAs), which typically include an optical detector array (ODA) and a read out integrated circuit (ROIC), to sense image information. One important class of FPAs are infrared sensing arrays. Such arrays are useful for image detection and motion sensing.

All objects, including the components of the FPA system, give off infrared radiation whose intensity is proportional to their temperature. In order maximize system sensitivity and minimize noise, thereby maximizing signal-to-noise ratio (SNR), it is common to cool infrared sensing FPAs to cryogenic temperatures to minimize system-induced noise in detected images and to prevent system component emissions from swamping desired low intensity images. By cryogenic temperatures, we mean temperatures of less than about 210° K (−63° C.), with the preferred operating temperatures for such systems typically being less than 100° K.

A typical cryogenic FPA has a cryogenic "volume" that must be held at cryogenic temperatures. This volume is typically isolated from the rest of the system and has limited thermal mass, and limited physical contact with outside environments. There are certain components that need to be in physical contact with the cryogenic volume, such as electrical lines that carry power and or data into/out of the FPA. Electrical lines are very good thermal conductors that provide paths for heat leakage into the cryogenic volume, which can be a problem for systems with multiple inputs/outputs. The electrical lines are also a source of electromagnetic interference (EMI) near the cryogenic area. As data transfer rates increase, the number of electrical lines, hence thermal losses will increase.

Figure 1:
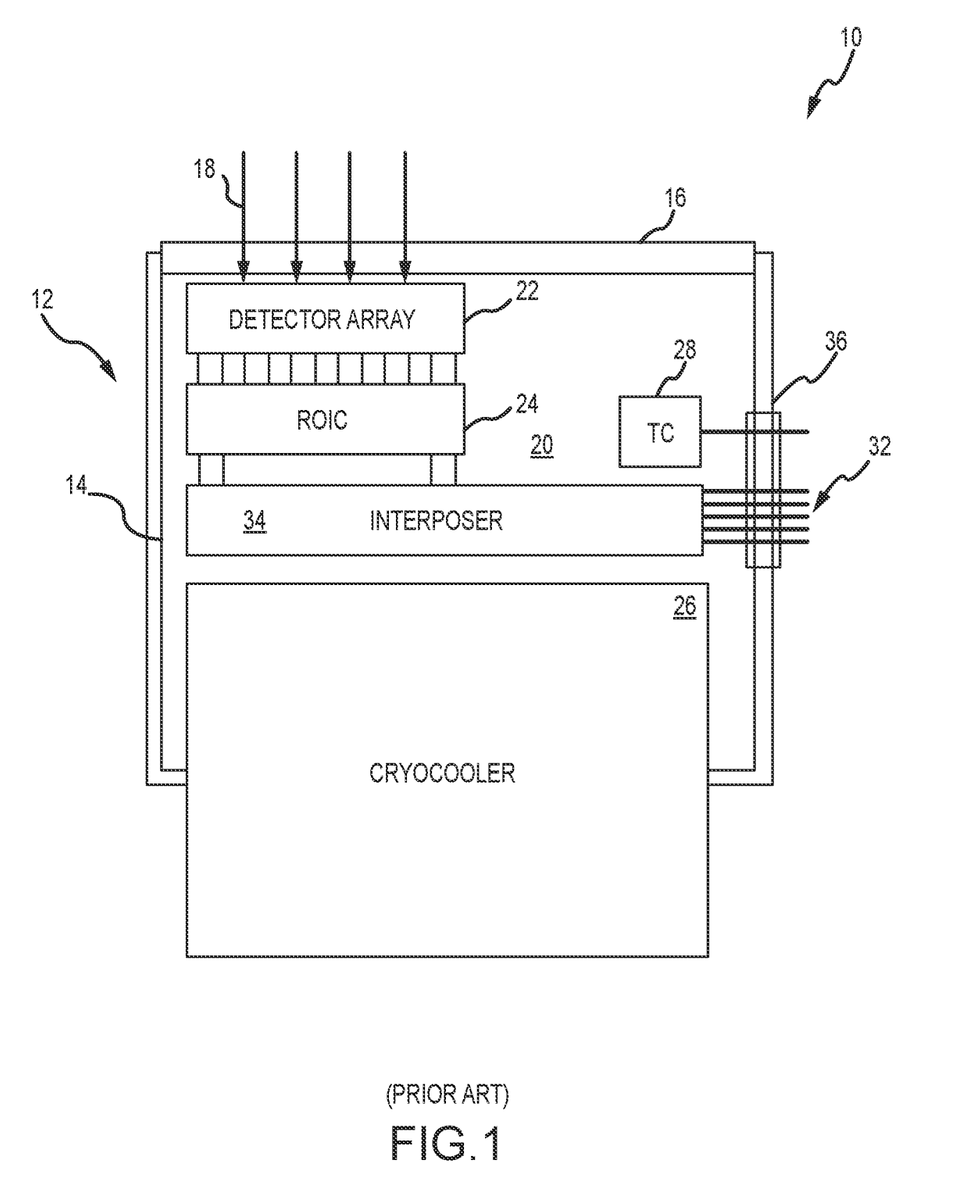
FIG. 1, as described above, is an embodiment of a typical cryogenically cooled IR sensor.

Referring now to FIG. 1, an exemplary cryogenic FPA 10 includes a vacuum sealed cryogenic chamber 12 aka a Dewar, which includes a double-walled construction 14 and a main optical window 16 that is substantially transparent to incident IR radiation 18. The volume within chamber 12 and within the double-walled construction 14 is held at vacuum to thermally isolate a cold volume 20 inside the chamber from the surrounding environment at ambient temperature. In particular, the evacuated chamber and double-walled construction resist irradiant thermal energy exchange with the surrounding air.

An IR optical detector array (ODA) 22 and a ROIC 24 are positioned in the cold volume 20 inside chamber 12. The ODA 22 and ROIC 24 are supported in contact with or otherwise in thermal communication with a miniature refrigeration device or cryocooler, generally indicated by reference numeral 26. Cryocoolers such as those based on a Stirling refrigeration cycle are well known in the relevant art. For example, system of expansion and compression chambers filled with gases and driven by pistons cools a "cold finger" that is in thermal contact with the cold volume. A thermocouple 28 measures the temperature inside the cold volume and feeds back the measurement via an electrical wire 30 to a controller in the cryocooler.

A number of electrical wires 32 penetrate the double-walled construction 14. These wires will bring electrical power signals such as various DC+, DC− and ground signals into the chamber. The wires also bring electrical Data IN signals such as gain and bias for the FPA and Data OUT signals from the ODA and ROIC. The wires 32 may terminate at an interposer 34 on which the ODA 22 and ROIC 24 are mounted. The interposer also serves to distribute the electrical power signals and Data IN signals to the ODA and ROIC and to receive electrical signals from the ROIC.

In operation, IR radiation 18 from a scene enters the main optical window 16 and is incident on IR FPA 22. The incident radiation excites pixels of the FPA, which convert the light into a plurality of detected electrical charges. The ROIC 24 measures the plurality of detected electrical charges over a specified interval and output electrical signals proportional to the charge. These output electrical signals form the Data OUT signals that passed on electrical wires 32 through the chamber walls to an external receiver for additional processing. In the best case, all of the electrical wires for Data IN/OUT, power and the thermocouple all run through one large electrical connector 36 providing a single penetration of the chamber.

In January 2017 AIM Photonics issued a government directed project call for a prototype FPA cryogenic integrated photonic datalink in which it is proposed to provide a cryogenic FPA with a Photonic Integrated Circuit (PIC) to increase data transfer rates from the ROIC to off-board electronics required to process and display the data. As described in the "Background" of the project call, current cryogenic systems use large numbers of electronic data transmission lines pass from the sensor in the dewar to external data cable connections, causing significant thermal conduction paths between the cold space of the dewar and the outside environment. As data rates and sensor sizes increase, it is not feasible to continue to add additional electronic data transmission lines, as it would require a cooling system whose capacity/size/weight would not be compatible with overall system requirements. An alternate ROIC is to create a PIC solution that has the potential, when using highly integrated 3D chip stacked form factors, to reduce power by 30× and increase data rates by 10× as compared to today's electronic data line technology.

Figure 2:
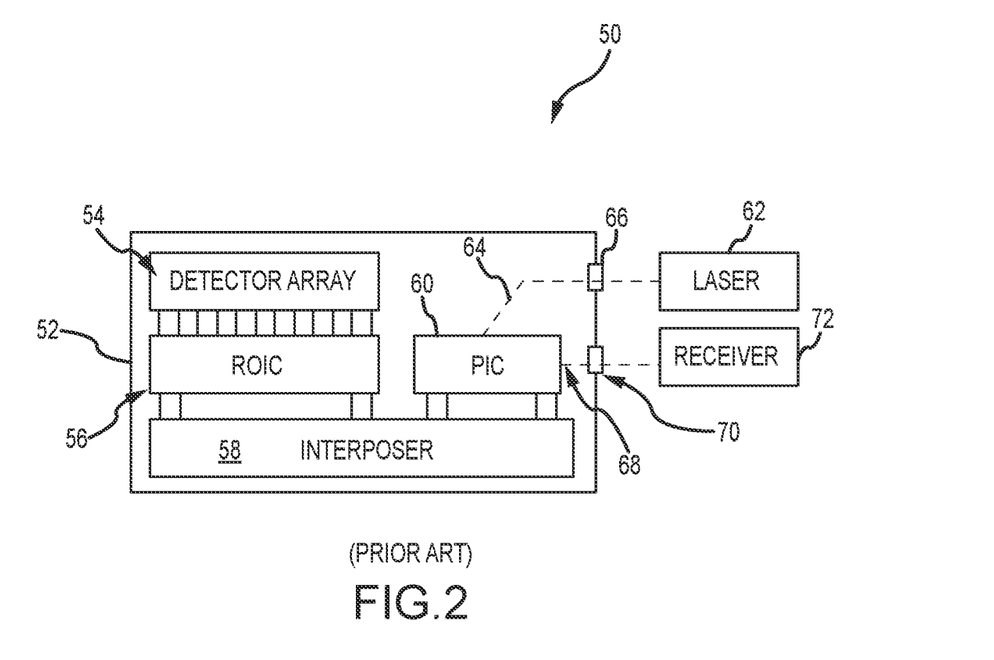
FIG. 2, as described above, is an embodiment of a Focal Plane Array (FPA) cryogenic integrated photonic datalink to read out sensor data.

Referring now to FIG. 2, an architecture of an FPA cryogenic integrated photonic datalink 50 as proposed by AIM Photonics comprises a cryogenic Dewar 52 sans the cryocooler. An IR optical detector array (ODA) 54 is mounted onto a ROIC 56, which in turn is mounted on an interposer 58. A PIC 60 is mounted on the interposer to receive the output electrical signals from the ROIC. Alternately, the ROIC and PIC could be mounted on a carrier and directly wire bonded to transfer electrical signals. An external laser 62 generates an optical carrier signal that is transmitted on optical fiber 64 via a fiber coupler 66 in the wall of the Dewar to the PIC, which modulates the optical carrier signal with the output electrical signals to form an optical data out signal that is transmitted on optical fiber 68 via a fiber coupler 70 to an external receiver 72. Replacing the electrical data outputs in traditional cryogenic FPAs with optical outputs offers a few advantages: optical channels can carry more data out of the cryo volume, and optical channels (typically over glass or polymer) have a much lower thermal conductivity, leading to lower thermal losses through the optical fiber.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides power to a cryogenic FPA with an optical data link optically thereby eliminating electrical penetrations of the cryogenic chamber for power delivery and further reducing heat leaks into the cold volume by copper wires and reducing electromagnetic interference in the cold volume.

In an embodiment, a cryogenic FPA comprises a vacuum sealed cryogenic chamber having a main optical window and a cryogenic cooler that maintains a desired set point temperature inside the chamber. An optical splitter receives and separates an optical input signal, provided at an optical input port in a chamber wall, to form an optical carrier signal and an optical power signal. An optical-to-electrical (O/E) converter converts the optical power signal into an electrical power signal. A regulator converts the electrical power signal into a plurality of DC voltage signals to supply power within the chamber. An optical detector array (ODA) receives light through the main optical window and converts the light into a plurality of detected electrical charges. A read out integrated circuit (ROIC) measures the plurality of detected electrical charges over a specified interval and outputs electrical signals proportional to the charge. An optical data link modulates the optical carrier signal with the electrical signals to form and output an optical data out signal at an optical output port in the chamber wall. The optical input and output ports may comprise a common I/O port.

In a preferred embodiment, there are no electrical penetrations of the chamber walls. A single optical penetration is sufficient to provide power to the chamber and to handle all data transfer. In a certain embodiment, the single optical penetration is positioned in the main optical window outside the FOV of the ODA.

In different embodiments, the cryogenic FPA may be all-fiber, all-free space or combinations thereof bring power to the chamber and to perform data transfer.

In different embodiments, the splitter may be a power, wavelength or polarization mode splitter.

In different embodiments, the optical data link receives an optical data in signal via the optical input port, converts it to electrical signals and distributes the signals to the ROIC or ODA. For example, such signals may include gain and offset for the ODA. The optical data in signal may be provided on a separate optical channel than the optical input signal. Alternately, it may be provided as part of the optical input signal with a different wavelength or polarization state.

These and other features and advantages of the invention will be apparent to those skilled in the art from the following detailed description of preferred embodiments, taken together with the accompanying drawings, in which:

DETAILED DESCRIPTION OF THE INVENTION

The conventional all-electrical cryogenic FPA has a single penetration (best case) to bring power to the chamber and provide data transfer. That single penetration may be a large electrical connector that suffers from heat leakage and EMI. AIM Photonic's architecture for a cryogenic FPA with a PIC increases the data transfer rates out of the ROIC and reduces heat leakage into the cold volume by copper wires and EMI. However, the proposed architecture does not eliminate electrical penetrations of the chamber. Power is brought into the chamber via electrical wires for various DC+, DC−, and ground signals. Furthermore, the thermocouple measurement is brought out of the chamber via an electrical wire. These remaining electrical penetrations provide paths for leaking heat and providing EMI. Best case, the AIM photonics architecture has two penetrations of the chamber; one electrical and one optical. In addition, the proposed architecture does not address how to bring data into the chamber for the detector or ROIC. For example, most detectors require gain and offset values that are typically provided via electrical penetrations.

The present invention builds upon AIM's proposed architecture to power the system via optical signals. In certain embodiments, the thermocouple measurement is read out optically and data in is provided optically. In a preferred configuration all electrical penetrations of the chamber are eliminated thereby eliminating the copper wire paths for heat leakage and EMI. In this preferred configuration, the proposed all-optical architecture requires a single optical penetration of the chamber, which in certain embodiments may be incorporated into the main optical window.

Figures 3A, 3B:
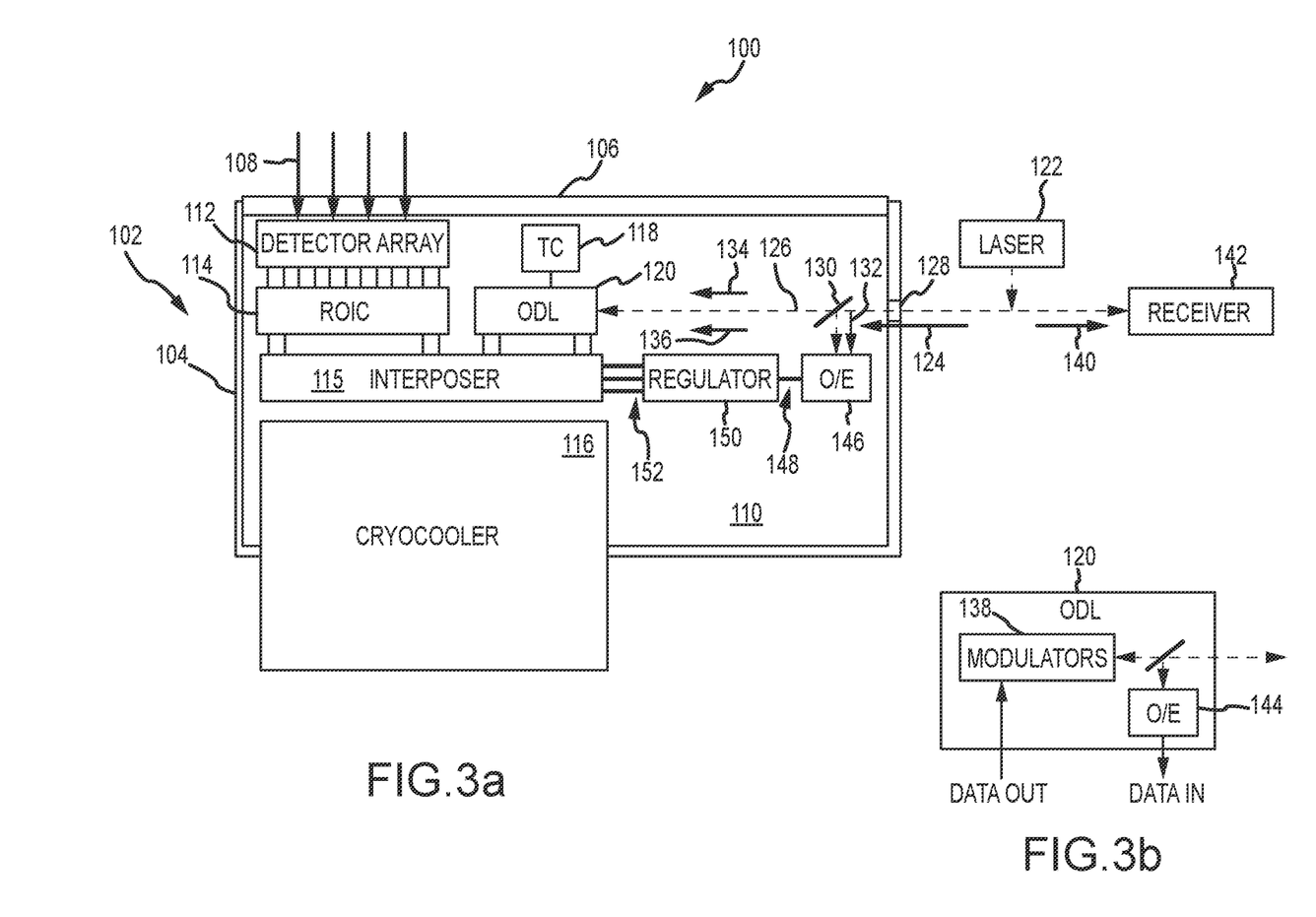
FIGS. 3a and 3b illustrate an embodiment of an all-fiber optically powered cryogenic FPA with an optical data link.

Referring now to FIGS. 3a and 3b, an embodiment of an optically powered cryogenic FPA with an optical data link 100 in an "all-fiber" configuration in which a single fiber coupler passes optical signals into and out of the chamber. A vacuum sealed cryogenic chamber 102 aka a Dewar includes a double-walled construction 104 and a main optical window 106 that is substantially transparent to incident IR radiation 108. The volume within chamber 102 and within the double-walled construction 104 is held at vacuum to thermally isolate a cold volume 110 inside the chamber from the surrounding environment at ambient temperature. In particular, the evacuated chamber and double-walled construction resist irradiant thermal energy exchange with the surrounding air.

An IR ODA 112 and a ROIC 114 are mounted on an interposer 115 and positioned in the cold volume 110 inside chamber 102. The ODA 112 and ROIC 114 are supported in contact with or otherwise in thermal communication with a miniature refrigeration device or cryocooler, generally indicated by reference numeral 116. Cryocoolers such as those based on a Stirling refrigeration cycle are well known in the relevant art. For example, system of expansion and compression chambers filled with gases and driven by pistons cools a "cold finger" that is in thermal contact with the cold volume. A thermocouple 118 generates an electrical measurement of the temperature inside the cold volume.

An optical data link 120 is mounted on the interposer 115 in electrical communication the ROIC 114 and thermocouple 118. Alternately, the ROIC and ODL could be mounted on a carrier and directly wire bonded to transfer electrical signals. The ODL may be implemented in a photonic integrated circuit (PIC) or using discrete optical components.

An external laser 122 generates an optical input signal 124 that is transmitted on optical fiber 126 via a fiber coupler 128 in the wall of the chamber. An optical splitter 130 separates the optical input signal 124 into an optical power signal 132, an optical carrier signal 134 and an optical Data IN signal 136. The optical carrier signal 134 and optical Data IN signal 136 are routed via optical fiber 126 to the ODL, which employs one or more modulators 138 to modulate the optical carrier signal with the electrical signals from the ROIC to form and output an optical Data OUT signal 140 via optical fiber 126 and fiber coupler 128 to a receiver 142. The ODL also includes an optical-to-electrical (O/E) converter 144 such as a photodetector that converts the optical Data IN signal 136 to electrical Data IN signals that are distributed via the interposer to the ROIC or ODA. Data IN may, for example, include gain and offset values for the ROIC. In certain embodiments, it may be possible to pre-program these values and eliminate the Data IN channel.

The optical power signal 132 is carried on an optical fiber to an O/E converter 146 that converts optical power signal 132 into an electrical power signal 148. A regulator 150 converts electrical power signal 148 into a plurality of DC voltage signals 152 (e.g. DC+, DC-, ground, etc.) to supply power within the chamber. The DC voltage signals 152 are suitably provided to interposer 115, which distributes the signals to the ODA, ROIC and ODL.

In operation, IR radiation 108 from a scene enters the main optical window 106 and is incident on IR ODA 112. The incident radiation excites pixels of the FPA, which convert the light into a plurality of detected electrical charges. The ROIC 14 measures the plurality of detected electrical charges over a specified interval and output electrical signals proportional to the charge. These output electrical signals form the Data OUT signals that are modulated onto the optical carrier signal as optical Data OUT signal 140 and pass via fiber coupler 128 through the chamber walls to external receiver 142 for additional processing. In the best case, all of the power and Data IN/OUT signals pass through the single fiber coupler 128. The thermal leakage through a single fiber coupler is considerably less than either a single large electrical connector or the combination of a fiber coupler and an electrical connector. The elimination of electrical penetrations also mitigates against EMI inside the chamber.

Figure 4A:
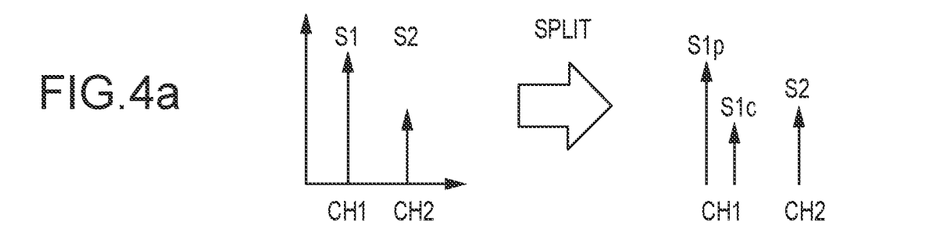
FIGS. 4a through 4c are different embodiments of an all-optical system for providing power to the FPA and bi-directional data.
Figure 4B:
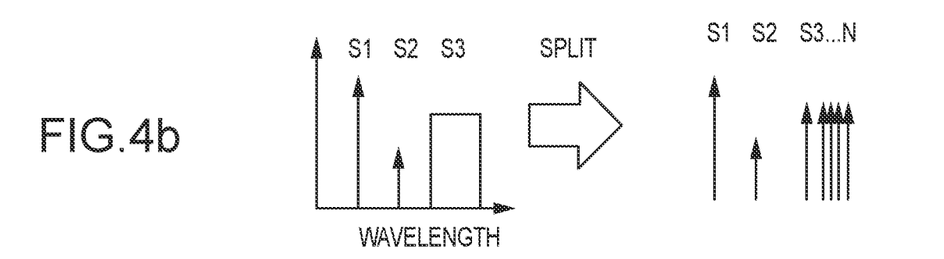
Figure 4C:
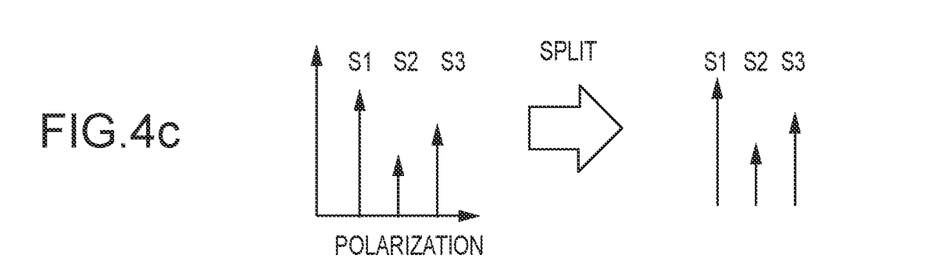

Referring now to FIGS. 4a-4c, the optical input signal that carries the optical carrier signal, optical Data IN signal and optical power signal into the chamber may be configured in a number of different ways. These are valid for all-fiber, all free-space or a hybrid fiber/free-space configurations for propagating the optical signals. If there is no Data IN, the S2 component may be eliminated.

As shown in FIG. 4a, the optical input signal may include a first optical signal component S1 and a second optical signal component S2 that are carried on separate optical channels into the chamber, for example through a single multi-fiber coupler or optical window. The optical splitter separates the first optical signal component S1 into an optical power signal S1$p$ and an optical carrier signal S1$c$. It is noted that the amplitude (or power) of S1 is considerably greater than S2, which only carries data. Furthermore, the amplitude (or power) of S1$p$, which carries the power, is considerably greater than S1$c$, which is the carrier for Data OUT.

As shown in FIG. 4b, the optical input signal may include a first, second and third optical signal components S1, S2 and S3 positioned at different wavelengths where S1 is the optical power signal, S2 is the optical Data IN signal and S3 is the optical carrier signal. S3 may be a narrow or broadband signal depending on the modulation scheme used to place the ROIC Data OUT onto the optical carrier signal. The optical splitter separates the optical input signal according to wavelength.

As shown in FIG. 4c, the optical input signal may include a first, second and third optical signal components S1, S2 and S3 positioned with different polarization states where S1 is the optical power signal, S2 is the optical Data IN signal and S3 is the optical carrier signal. There are two orthogonal polarizations s and p in which many different polarization states may occur through combinations of s and p. The optical splitter separates the optical input signal according to polarization state.

Figure 5:
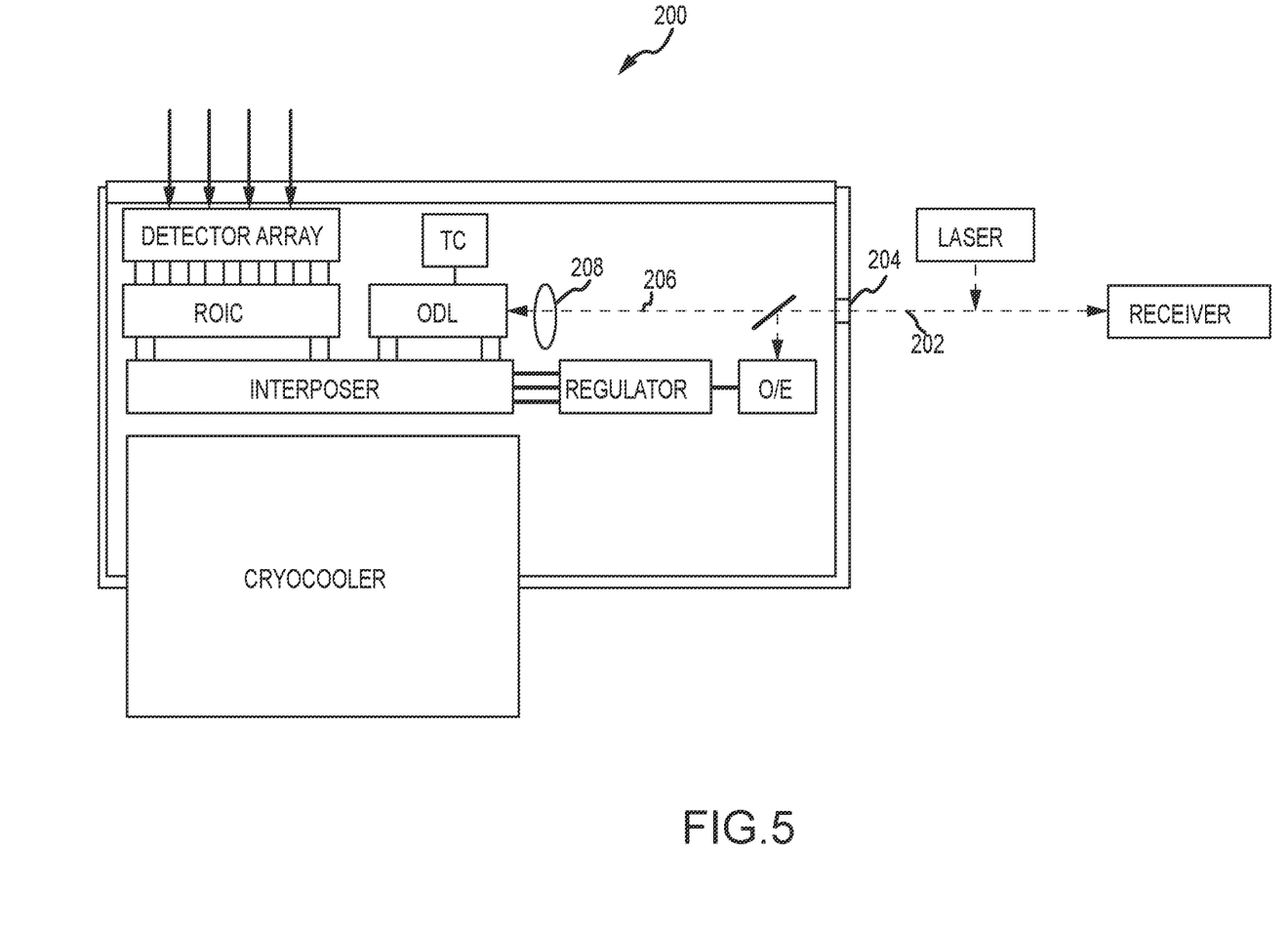
FIG. 5 is an embodiment of a fiber outside, free-space inside optically powered cryogenic FPA.
Figure 6A:
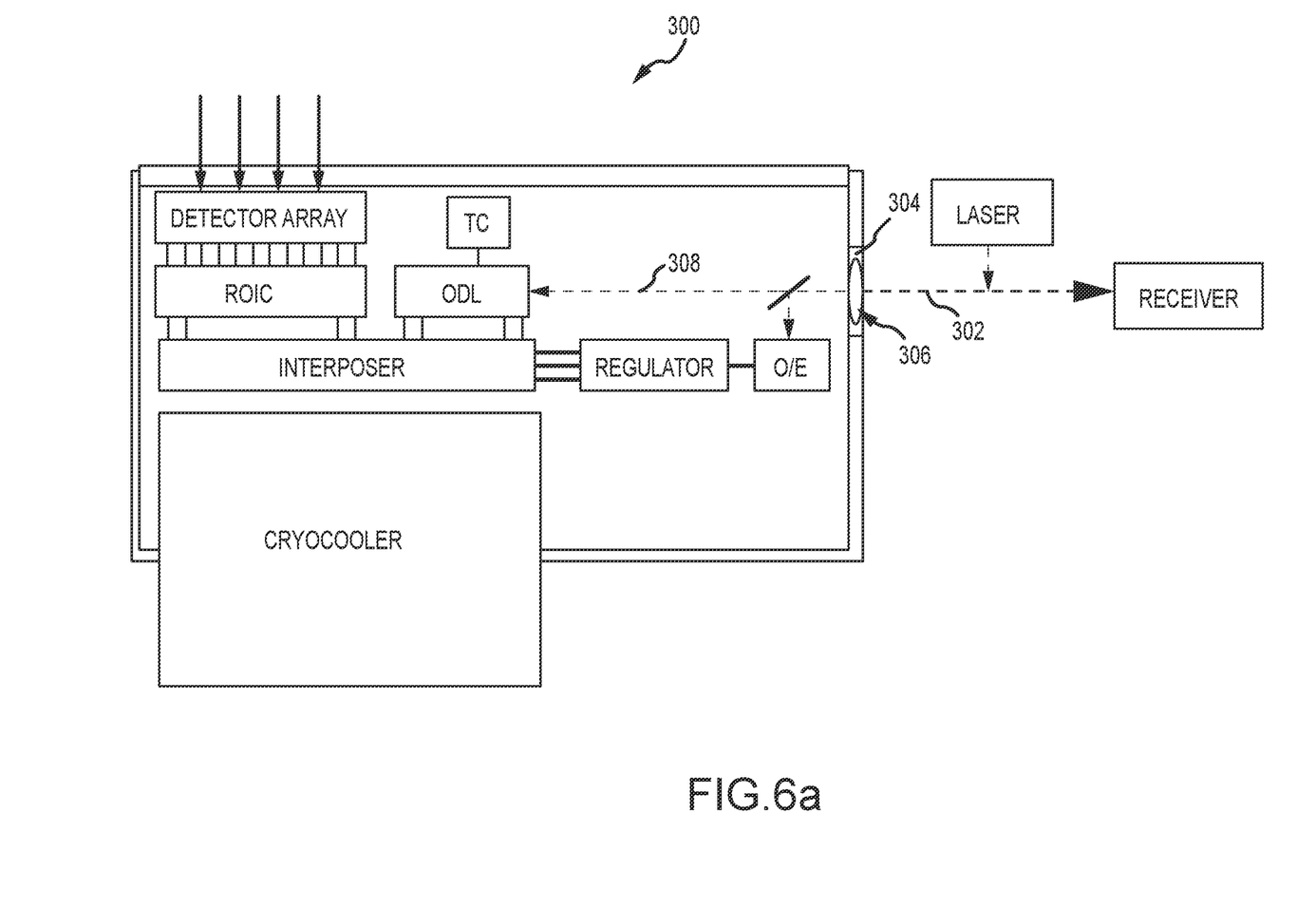
FIGS. 6a and 6b are different embodiments of a free-space outside, fiber inside optically powered FPA.
Figure 6B:
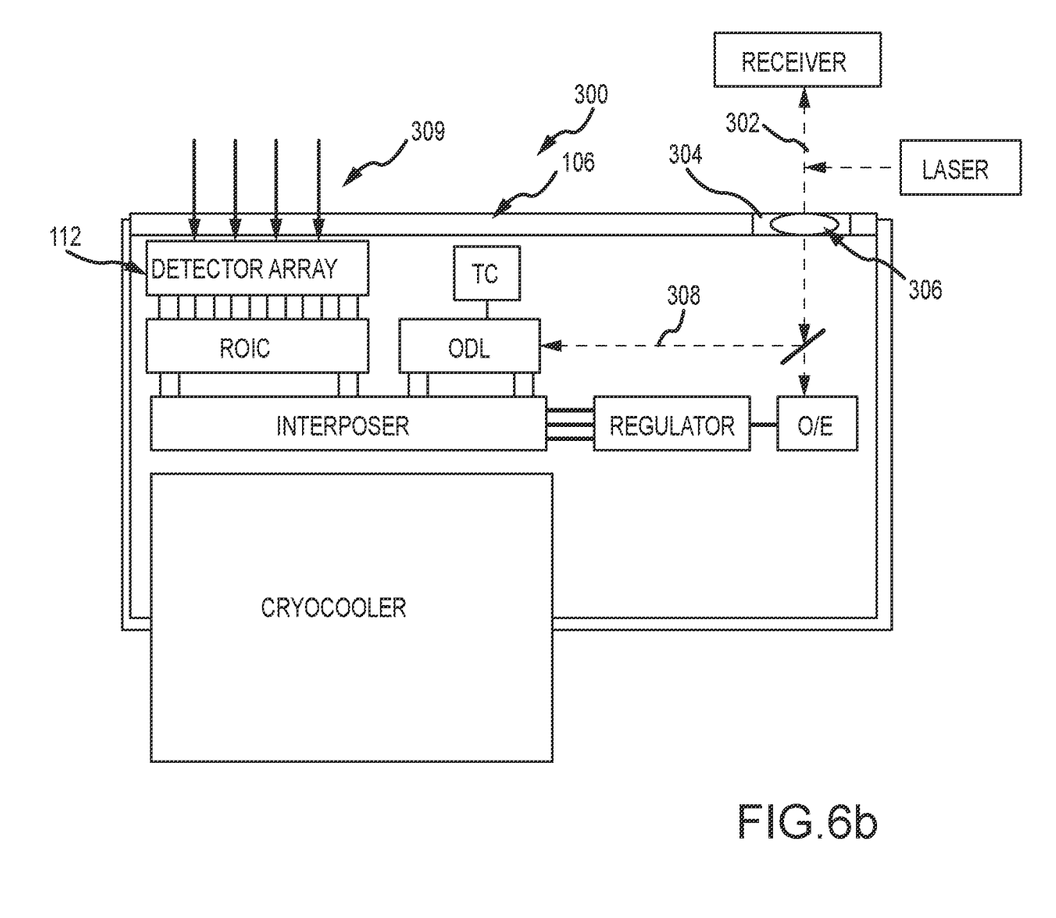
Figure 7:
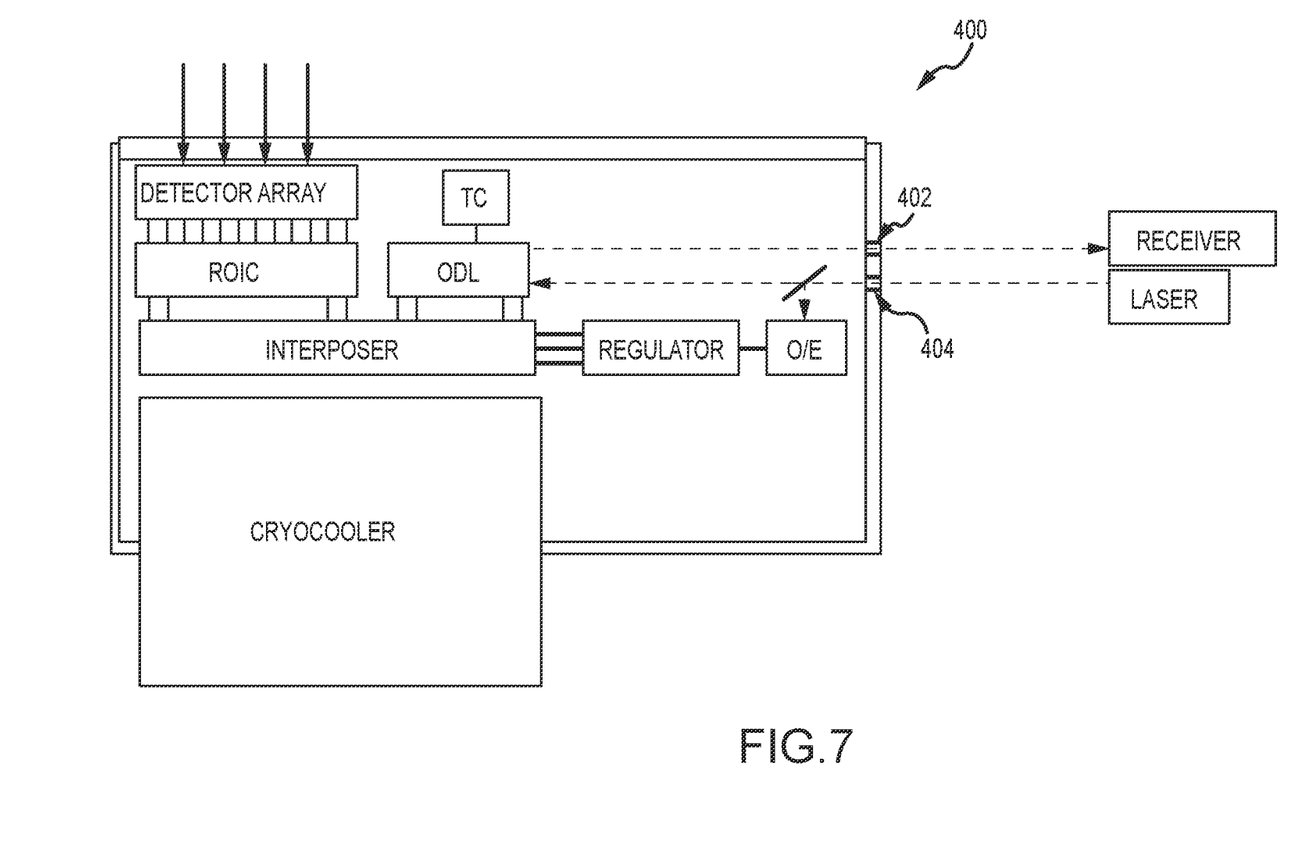
FIG. 7 is an embodiment of a optically powered cryogenic FPA having separate input and output ports.

The optically powered cryogenic FPA with an optical data link may be implemented in an all-fiber configuration to route the optical signals as illustrated in FIG. 3, hybrid fiber and free-space configurations as illustrated in FIGS. 5 and 6a/6b, an all-free space configuration or in any of these configurations using separate input and output ports as illustrated in FIG. 7. For purposes of brevity and clarity, the common components will have like reference numbers and the description thereof will not be duplicated.

As shown in FIG. 5, an optically powered cryogenic FPA with an optical data link 200 uses optical fiber 202 and an optical fiber coupler 204 to bring optical signals to and from the cryogenic chamber. Fiber coupler 204 includes a lens that collimates light entering the chamber to form collimated free-space optical signals 206. A lens 208 focuses the optical carrier signal and optical Data IN signals into a fiber coupler in the ODL. The lens in the fiber coupler focuses the free space optical signals leaving the chamber into optical fiber 202.

As shown in FIGS. 6a and 6b, an optically powered cryogenic FPA with an optical data link 300 uses free-space optics to bring optical signals 302 to and from the cryogenic chamber. The free-space optical signals pass through an optically transparent window 304 formed in the wall of the chamber. A lens 306 formed in the window (or adjacent thereto) collimates light entering the chamber to form collimated optical signals in optical fiber 308. In FIG. 6b, window 304 is positioned within main optical window 306 outside the FOV 309 of ODA 112 thereby avoiding an additional optical penetration of the chamber. In some embodiments window 304 can be the same window as window 106 and lens 306 is adjacent to the window 106.

As shown in FIG. 7, an optically powered cryogenic FPA with an optical data link 400 uses separate input and output ports 402 and 404, respectively, to carry optical signals (e.g. the optical carrier signal, optical Data IN signal and optical power signal) into the chamber and to carry the optical Data OUT signal out of the chamber. The input and output ports may be fiber couplers, optical windows or a combination thereof. The optical signals may be carried on an all-fiber, all free-space or hybrid optical network.

The primary function of the optical data link (ODL) is superimpose the electrical signals from the ROIC (e.g. that define an IR image of scene) onto the optical carrier signal to form an optical Data OUT signal. This superposition may be implemented in a variety of ways including but not limited to time or wavelength multiplexing the electrical signals onto the optical carrier signal. As compared to electrical read out, the optical readout supports much higher data transfer rates. In some embodiments, the electrical temperature measurement from the thermocouple may also be superimposed onto the optical carrier signal. In most embodiments, Data IN such as gain and offset values for the ROIC must be read into the system. The ODL detects the optical Data IN signal and converts it to electrical signals that are distributed to the appropriate devices within the chamber.

Figure 8A:
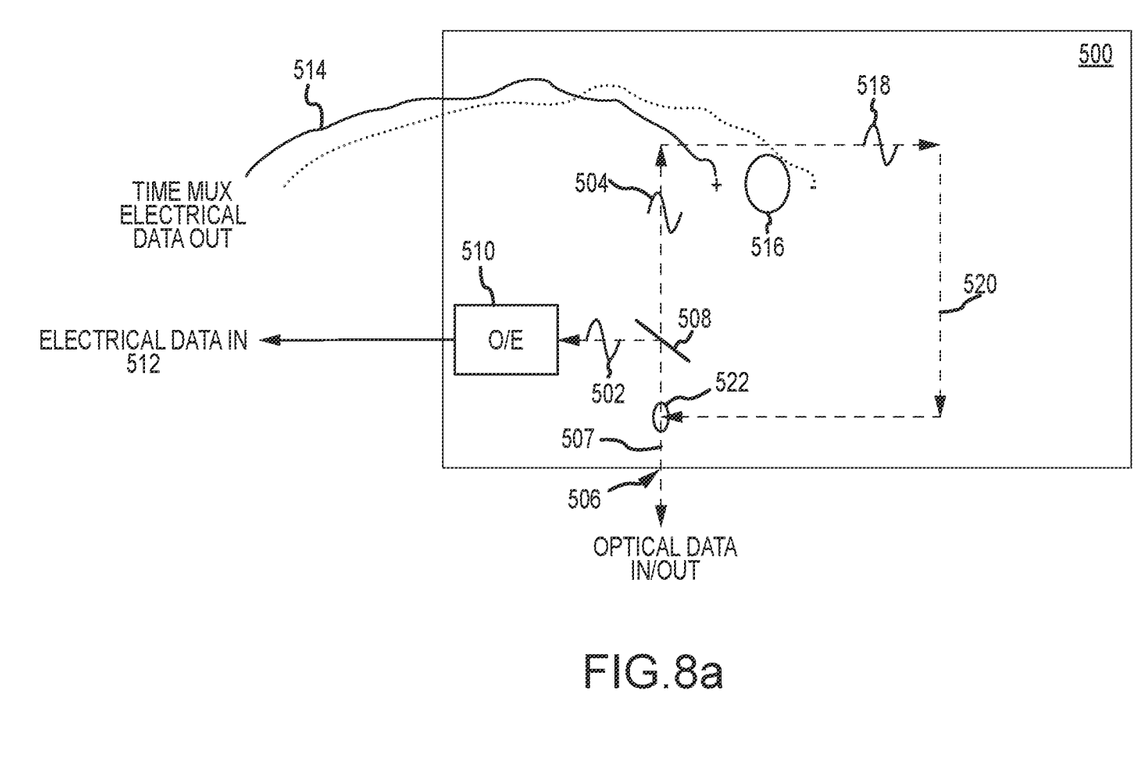
FIGS. 8a and 8b are embodiments of time and wavelength multiplexed bi-directional optical data links, respectively.

Referring now to FIG. 8a, an embodiment of an ODL 500 employs time division multiplexing to superimpose the ROIC Data OUT onto the optical carrier signal. An optical Data IN signal 502 and an optical carrier signal 504 enter the ODL via a fiber coupler 506 and input fiber 507. An optical splitter 508 separates the optical carrier signal 504 and optical Data IN signal 502. An O/E converter 510 converts the optical data IN signal 502 to electrical Data IN signals 512. The electrical Data IN signals 514 are time multiplexed into a single electrical signal by the ROIC. The temperature measurement may be multiplexed into a specified time slot. A modulator 516 such as a Ring or Mach Zender or other modulator modulates optical carrier signal 504 with the electrical Data IN signals 514 to form an optical Data OUT signal 518 that is carried on optical fiber 520. A fiber coupler 522 couples the optical Data OUT signal 518 back to the input fiber 507 to be output from the ODL.

Figure 8B:
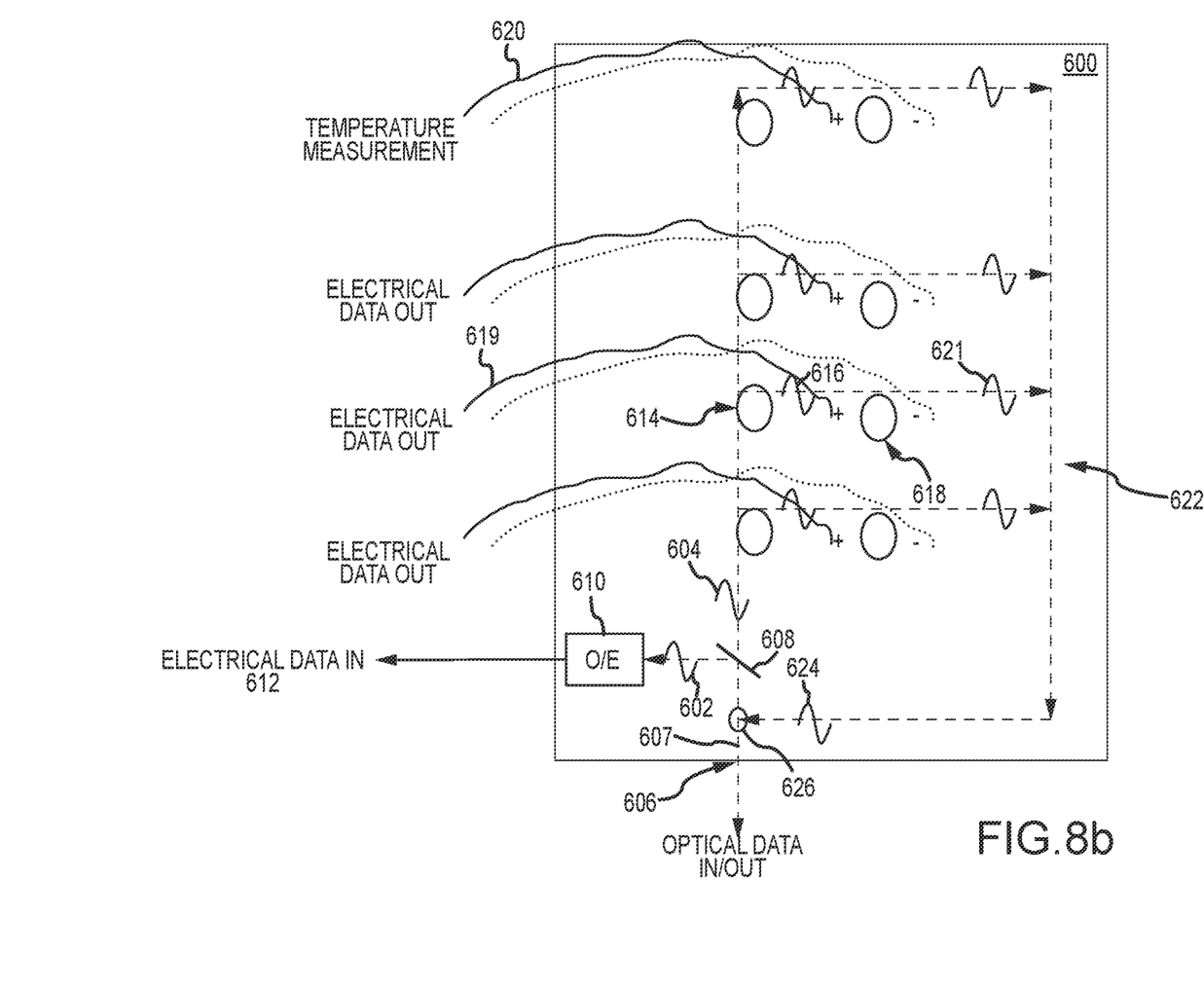

Referring now to FIG. 8b, an embodiment of an ODL 600 employs wavelength division multiplexing to superimpose the ROIC Data OUT onto the optical carrier signal. A wavelength diverse optical Data IN signal 602 and an optical carrier signal 604 enter the ODL via a fiber coupler 606 and input fiber 607. An optical splitter 608 separates the optical carrier signal 604 and optical Data IN signal 602. An O/E converter 610 converts the optical data IN signal 602 to electrical Data IN signals 612. Optical carrier signal 604 is fed to a bank of narrow band filters 614 at different wavelengths to form a plurality of narrowband carrier signals 616. A bank of modulators 618 such as a Ring or Mach Zender or other modulator modulate the respective narrow band carrier signal 616 with the electrical Data IN signals 619 and temperature measurement 620 to form a plurality of optical Data OUT signals 621 at different wavelengths. A N: 1 fiber combiner 622 combines the plurality of optical Data OUT signals 621 to form a single Data OUT signal 624 that is injected through a fiber coupler 626 to the input fiber 607 to be output from the ODL Alternately, the N optical Data OUT signals 621 could be output as N separate channels.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:
1. A cryogenic focal plane array (FPA), comprising:
   a vacuum sealed cryogenic chamber having a main optical window;
   an optical splitter inside the chamber configured to receive and separate an optical input signal at an optical input port to form an optical carrier signal and an optical power signal;
   a first optical-to-electrical (O/E) converter inside the chamber that converts the optical power signal into an electrical power signal;
   a regulator inside the chamber converts the electrical power signal into a plurality of DC voltage signals to supply power within the chamber;
   an optical detector array (ODA) inside the chamber configured to receive light through the main optical window and convert the light into a plurality of detected electrical charges;
   a read out integrated circuit (ROTC) inside the chamber configured to measure the plurality of detected electrical charges over a specified interval and output electrical signals proportional to the plurality of detected electrical charges;
   an optical data link (ODL) inside the chamber, said ODL including an electro-optic (E/O) modulator configured to receive and modulate the optical carrier signal with the electrical signals to form and output an optical data out signal at an optical output port; and
   a cryogenic cooler that maintains a desired set point temperature inside the chamber.

2. The cryogenic FPA of claim 1, wherein there are no electrical penetrations of the vacuum sealed cryogenic chamber.

3. The cryogenic FPA of claim 1, where in the optical input port and optical output port comprise a common I/O port.

4. The cryogenic ETA of claim 1, wherein the optical input port and optical output port comprise fiber connectors, wherein the optical input signal and the optical data out signal are routed to and from the chamber with optical fiber, wherein optical input signal, optical carrier signal, optical power signal and optical data out signal are routed within the chamber with an all-fiber network.

5. The cryogenic FPA of claim 1, wherein the optical input port and optical output port comprise one or more fiber connectors, wherein the optical input signal and optical data out signal are brought to and from the chamber with optical fiber, wherein the optical input signal, optical carrier signal, optical power signal and optical data out signal are routed within the chamber with free-space optics.

6. The cryogenic FPA of claim 1, wherein the optical input port and optical output port comprise one or more optical windows, wherein the optical input signal and optical data out signal are brought to and from the chamber with free-space optics, wherein at least the optical carrier signal and the optical data out signal are routed to and from the optical data link with optical fiber.

7. The cryogenic FPA of claim 6, wherein the ODA has a field-of-view (FOV) within the main optical window, wherein the one or more optical windows are positioned within the main optical window outside the detector FOV.

8. The cryogenic FPA of claim 1, wherein the splitter comprises one of a power splitter, a wavelength splitter or a polarization mode splitter.

9. The cryogenic FPA of claim 1, further comprising a thermocouple within the chamber to measure a temperature, wherein the temperature measurement is output via the optical data link.

10. The cryogenic FPA of claim 1, wherein the optical data link comprises a plurality of N modulators that modulate the electrical signals onto the optical carrier signal using time division multiplexing, wavelength division multiplexing or N optical carrier signals to form the optical data out signal.

11. A cryogenic focal plane array (FPA) of claim 1, comprising:
a vacuum sealed cryogenic chamber having a main optical window;
an optical splitter inside the chamber configured to receive and separate an optical input signal at an optical input port to form an optical carrier signal and an optical power signal;
a first optical-to-electrical (O/E) converter inside the chamber that converts the optical power signal into an electrical power signal;
a regulator inside the chamber converts the electrical power signal into a plurality of DC voltage signals to supply power within the chamber;
an optical detector array (ODA) inside the chamber configured to receive light through the main optical window and convert the light into a plurality of detected electrical charges;
a read out integrated circuit (ROIC) inside the chamber configured to measure the plurality of detected electrical charges over a specified interval and output electrical signals proportional to the plurality of detected electrical charges;
an optical data link inside the chamber configured to receive and modulate the optical carrier signal with the electrical signals to form and output an optical data out signal at an optical output port, wherein the optical data link comprises a second optical-to-electrical converter (O/E) that is configured to receive an optical data in signal via the optical input port, convert it to electrical data signals and distribute the electrical data signals to the ODA or the ROIC; and
a cryogenic cooler that maintains a desired set point temperature inside the chamber.

12. The cryogenic FPA of claim 11, wherein the optical data in signal includes gain and offset for the ODA.

13. The cryogenic FPA of claim 11, wherein the optical input port receives the optical input signal and the optical data in signal on separate channels.

14. The cryogenic FPA of claim 11, wherein the optical input signal comprises the optical power signal, the optical carrier signal and the optical data in signal at three different wavelengths, wherein said splitter separates the optical input signal into the optical power signal, the optical carrier signal and the optical data in signal.

15. The cryogenic FPA of claim 11, wherein the optical input signal comprises the optical power signal, the optical carrier signal and the optical data in signal at three different polarization states, wherein said splitter separates the optical input signal into the optical power signal, the optical carrier signal and the optical data in signal.

16. A cryogenic focal plane array (FPA), comprising:
a vacuum sealed cryogenic chamber having a main optical window;
an optical splitter inside the chamber configured to receive and separate an optical input signal provided to the chamber on an optical fiber at an I/O fiber connector to form an optical carrier signal and an optical power signal;
an optical-to-electrical (O/E) converter inside the chamber that converts the optical power signal into an electrical power signal;
a regulator inside the chamber converts the electrical power signal into a plurality of DC voltage signals to supply power within the chamber;
an optical detector array (ODA) inside the chamber configured to receive light through the main optical window and convert the light into a plurality of detected electrical charges;
a read out integrated circuit (ROIC) inside the chamber configured to measure the plurality, of detected electrical charges over a specified interval and output electrical signals proportional to the plurality of detected electrical charges;
a bi-directional optical data link (ODL) inside the chamber, said bi-directional ODL configured to receive the optical carrier signal from a common optical fiber, use an electro-optic (E/O) modulator to modulate the optical carrier with the electrical signals to form an optical data out signal and return the optical data out signal via the common optical fiber to the I/O fiber connector that is routed away from the chamber on the optical fiber; and
a cryogenic cooler that maintains a desired set point temperature inside the chamber.

17. The cryogenic FPA of claim 16, wherein there are no electrical penetrations of the vacuum sealed cryogenic chamber.

18. A cryogenic focal plane array (FPA), comprising:
a vacuum sealed cryogenic chamber having a main optical window;
an optical splitter inside the chamber configured to receive and separate an optical input signal at an optical input port to form an optical carrier signal and an optical power signal;
a first optical-to-electrical (O/E) converter inside the chamber that converts the optical power signal into an electrical power signal;
a regulator inside the chamber converts the electrical power signal into a plurality of DC voltage signals to supply power within the chamber;
an optical detector array (ODA) inside the chamber configured to receive light through the main optical window and convert the light into a plurality of detected electrical charges;
a read out integrated circuit (ROIC) inside the chamber configured to measure the plurality of detected electrical charges over a specified interval and output electrical signals proportional to the plurality of detected electrical charges;
a bi-directional optical data link (ODL) including an electro-optical (E/O) modulator and a second O/E converter positioned inside the chamber, said bi-directional ODL configured to (a) receive an optical data in signal, use the second O/E converter to convert the optical data in signal to electrical data signals and distribute the electrical data signals to the ODA or ROIC and (b) to use the E/O modulator to modulate the optical carrier signal with the electrical signals to form and output an optical data out signal at an optical output port; and
a cryogenic cooler that maintains a desired set point temperature inside the chamber.

19. The cryogenic FPA of claim 18, wherein the optical input port receives the optical input signal and the optical data in signal on separate channels.

20. The cryogenic FPA of claim 18, wherein the optical input signal comprises the optical power signal, the optical carrier signal and the optical data in signal at three different wavelengths or three different polarization states, wherein said splitter separates the optical input signal into the optical power signal, the optical carrier signal and the optical data in signal.

21. The cryogenic FPA of claim 18, wherein there are no electrical penetrations of the vacuum sealed cryogenic chamber.

* * * * *